Apr. 17, 1923.

N. B. HENRY

COOKER

Filed Mar. 11, 1921

INVENTOR.
Nelson B Henry
BY
Mitchell, Chadwick & Kent
ATTORNEYS

Patented Apr. 17, 1923.

1,451,729

UNITED STATES PATENT OFFICE.

NELSON B. HENRY, OF ATLANTA, GEORGIA, ASSIGNOR TO THE MURRAY COMPANY, OF DALLAS, TEXAS, A CORPORATION OF TEXAS.

COOKER.

Application filed March 11, 1921. Serial No. 451,636.

*To all whom it may concern:*

Be it known that I, NELSON B. HENRY, a citizen of the United States, residing at Atlanta, in the county of Fulton and State of Georgia, have invented certain new and useful Improvements in Cookers, of which the following is a specification.

My invention relates to an improvement in cookers, for vegetable material, such as various grains or meals, copra, cotton seed and other nuts and seeds. The grains are subjected to a cooking process in preparation, in whole or in part, for sale or consumption, while the other materials, which are oil bearing, are cooked in preparation for the extraction of the oil therefrom. The amount and quantity of the oil yield from a vegetable oil bearing material operated upon will vary greatly according to the cooking process employed prior to the actual oil expression by pressing in a suitable press. With regard to grains, the cooking process, having regard to the desired characteristics in the cooked product, is also important. There is a best process for cooking every material, as to time of cooking, temperature and the time application and variation of temperature.

Very dry material, as for example, dry cottonseed meats, attains its proper cooked temperature much more rapidly than material having high moisture content. It is obvious therefore that the treatment of such material should be shorter as compared to some other materials, in order that the apparatus may bring the material to a condition where the highest percentage of oil of the best quality may be produced in the subsequent treatment of the materials in an oil press, without either overcooking or undercooking and which will at all times cause the apparatus to work at maximum capacity.

In the drawings:

Figure 2 is a sectional plan view, showing the passages and valves between the superposed pans;

Figure 5 is a detail of the thermostat heat control.

Figure 1:
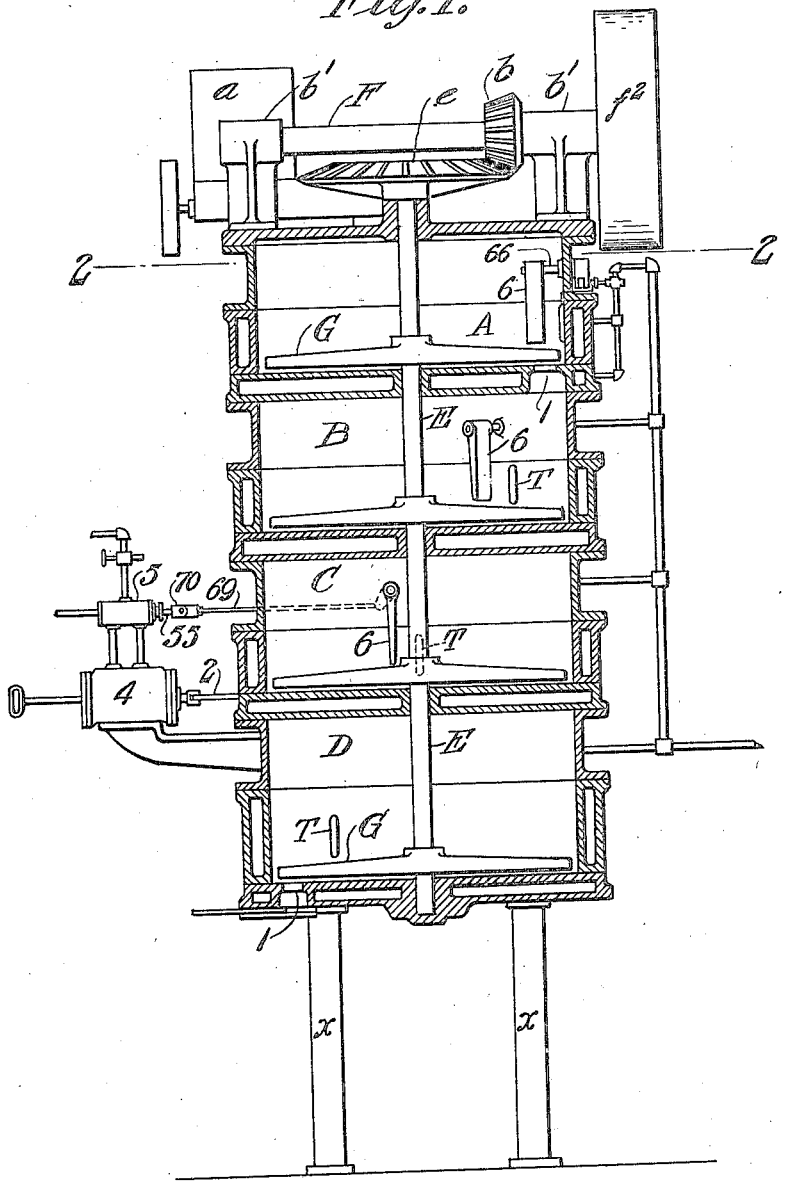
Figure 1 shows a sectional elevation of a cooker having multiple superposed pans.
Figure 3:
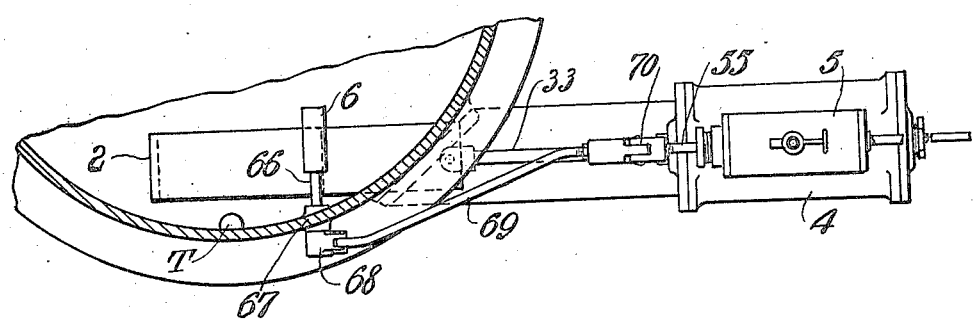
Figures 3 and 4 are detail views on an enlarged scale of the control blade and motor.

It will be obvious that in such an apparatus it is a desideratum that it shall be as nearly as may be, self-controlled, reducing the labor element of supervision to a minimum and producing a more exact and regular application of the cooking process. To this end, the control of the heat element or factor in cooking is controlled by the application of the thermostat to the control of the steam entering the steam jackets of the cooker, to predetermine the heat in the cooker, varying it by adjustment, as desired, in the several pans of the cooker.

In the best method of cooking oil bearing vegetable material, the cooking time should be uniform for a given seed or nut mass, and must, according to the qualities of the material, be varied from time to time. Very dry material requires very much less time to properly cook than does material having a high moisture content. The material enters the cooker at atmospheric temperature and it is desirable that it should be raised as quickly as possible to a temperature of about 150° Fahrenheit, which will begin to affect the mass, and thereafter, during the requisite period, by successive increments of heat, be gradually raised to a maximum heat of about 225° Fahrenheit. The intermediate degrees of heat might be provided by a gradually increased heat application to a single container, but such a method is not controllable, without constant tests and oversight, and in my apparatus I provide a multiplicity of containers, each separately goverened as to heat, from one of which to another the mass constantly progresses through a constantly increasing temperature, until it reaches, in the last container its maximum of 225° Fahrenheit.

In my apparatus, I provide a multiplicity of pans or containers, showing in the drawings four such plans, super-imposed, into the uppermost of which, A, the material is passed through a feed mechanism, $a$, feeding constantly a measured quantity per minute. Pan A rests upon pan B, pan B upon pan C and pan C upon pan D, which last is supported upon columns, X. Passing centrally through the several pans is a central shaft E carrying at its upper end a gear, $e$, meshing with a gear, $f$, fast to a shaft F carried in bearings $f'$ upon the upper end of the apparatus. A pulley $f^2$ is provided by which the shafts E and F may be rotated from some power source. In the bottom of each pan is an aperture or opening, 1, of suitable opening area provided with a movable slide valve, 2, which passes through the walls of the pan and is connected to the piston rod, 33, of a piston 3, working in a cylinder, 4. The piston is controlled by a three-way slide valve (or other suitable valve), 5, by means of which steam or other fluid pressure may be admitted or exhausted from either end of the cylinder, as required in the operation of my apparatus.

The operation of valve 5 is controlled by a blade, 6, swinging on a stem 66, mounted in a bearing, 67, and passing through the bearing through the walls of the pan in which it is mounted. A crank arm 68 is secured upon the outer end of stem 66 which engages a connecting rod 69, adjustably connected by a clevis 70 to the piston 55 of slide valve 5.

The several pans are provided with adjustable thermostats T, of any desired type, which are preferably arranged in each pan near the outlet thereof, and which control the steam inlet from the branch steam pipes $t'$, leading from the main steam pipe, $t$.

Operation: The operation of my apparatus is continuous. It is designed to receive at the upper end a fixed quantity of material per minute which is discharged, cooked, at the other end at the same average rate. It is obvious that the proper cooking will be dependent upon the nature of the particular material operated upon, as to dryness, etc., and that the material, according to its nature should be given a longer or shorter treatment in the cooker in order to attain the best possible results. In order to accomplish this with the greatest accuracy I arrange the exit passages or openings, 1, between each pan and the next pan below, so that they are not placed directly above or beneath each other, but, on the contrary, each opening is offset from the opening from the pan above and from the opening from the pan below (see Figure 2). The sweeps G are, in the apparatus shown, designed to move in clock-wise fashion, as indicated by the arrow in Figure 2, and at a uniform speed of rotation, and the direction of the offset of the apertures 1, is governed by the direction of rotation of the sweeps G, i. e., the apertures are offset successively in a spiral line, in a direction opposite to that of the direction of rotation of the sweeps. This prevents material entering a pan from passing out of the pan until it has made a slow circuit of the pan under the urge of the rotating sweeps, and has thus reached the aperture 1 in the bottom of any given pan. These sweeps, it may be stated, do not push the mass about bodily, but, moving at a regular speed, near the bottom of the pan and of the mass, through the mass, develop a frictional engagement with the mass, the persistent application of which urges the mass in a rotary path within the pan. The progress of the sweep creates a wave-like movement in the mass, which continually disturbs it and the continual abstraction of material from the bottom of the mass as the mass passes over the aperture 1 in the bottom of the pan causes, in addition, a continual sinking of the mass, compensated by continual accretion of material from the pan above upon the upper surface of the mass. It will now be obvious that the time of cooking will be dependent upon the time required for any given portion of the mass, after entering the cooker, to make the circuit of the successive pans and be successively discharged into a lower pan and finally, from the cooker, and that this will be dependent upon the size of the entire mass contained in the cooker on any given run or operation. The feed and the discharge must necessarily be equal in operation, otherwise the pans would fill and the apparatus choke, but within definite limits of capacity the several pans may each contain a minimum amount which will make the circuit and be discharged in a minimum time, or may each contain a maximum amount, any part of which will require a maximum time to reach the discharge. To accurately govern the cooking period from the minimum to the maximum required it is necessary to provide means for controlling the material which shall be in the several pans of the cooker at any one time.

Figure 4:
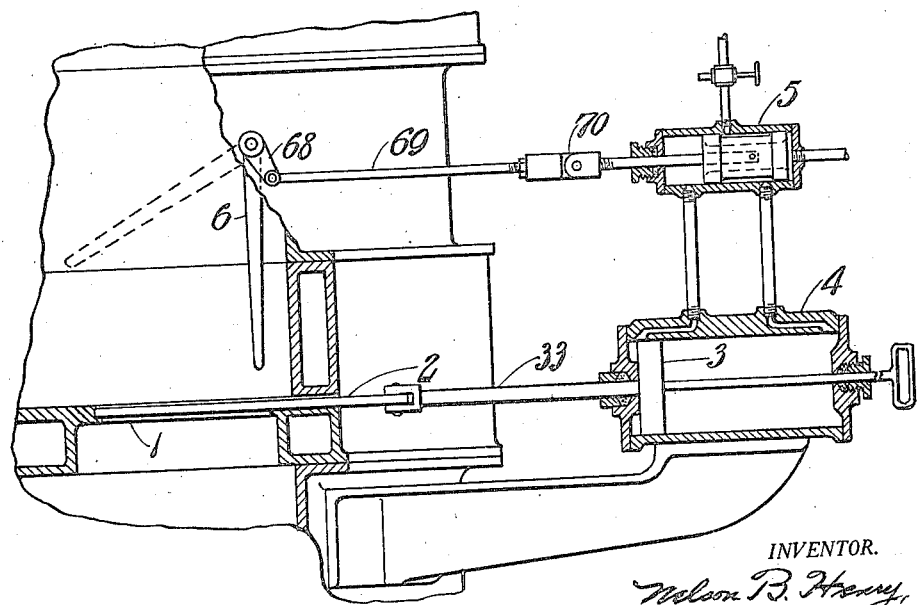

I accomplish this by providing a slide valve, 2 for each aperture, the slide valve being controlled by a piston, 3 in a cylinder, 4, i. e., a motor, which obviously might be of any kind, though I have shown a fluid pressure motor, preferably operated by steam. The operation of the motor to cause it to open or close the slide valve is controlled by the blade or paddle, 6, which is in contact with the mass in the pan and as the mass moves is pushed toward a horizontal position, (see Figure 4). By means of the clevis adjustment provided at 70 the position of the blade 6 is caused to operate the motor to open or close the slide valve 5, as the level of the mass in the pan tends to rise above or fall below a predetermined level, and checks the tendency as it develops, maintaining a certain position of the blade due to the pressure of the uniformly moving mass, actuated by the sweep G, against the side of the blade and thus maintaining a constant quantity of mass in the pan, which is determined by the adjustment between the blade and the motor.

I prefer to carry in the pan A a relatively small amount of material, which, under the urge of the sweeps, will move relatively fast in its circular path, and being of small bulk will be easily raised from atmospheric temperature to the first temperature designed, say 150° Fahrenheit. This temperature is governed by the provision of the thermostat T, controlling the steam to the jacket spaces of the several pans, and set to open or close the steam admission when the temperature at the point of discharge exceeds or falls below the designed temperature. Assuming that 100 pounds will fill tank A to a depth of say 6 inches, the blade 6 is adjusted in its relation to the motor, to operate the slide valve suitably when the depth varies from six inches either up or down. The blade 6 and motor may be adjusted for a depth of twelve inches in pan B, equal to 200 pounds, of mass, and temperature, for example, at 200° Fahrenheit. The blade 6 and motor may be adjusted for a depth of eighteen inches in pan C equal to 300 pounds, of mass, and temperature of 220° Fahrenheit. The temperature of pan D is, for example, 225° Fahrenheit. No blade and motor control is usually provided in pan D, the mass, in starting a run, is allowed to accumulate to any amount desired in pan D, and thereafter is intermittently discharged, in measured quantities in a given time, equal on the average to the quantity fed to tank A in the given time.

I claim:

1. In a cooker for a vegetable mass, a multiplicity of superposed, jacketed cooking pans, each pan provided with an exit passage through the walls thereof; a sliding valve at the exit passage to vary the effective area thereof; motors to actuate each exit valve to vary without closing the valve, the effective area of the exit opening; in combination with means within each pan to actuate the mass in a circular path and means actuated by the movement of the mass to control the motor to vary the area of the exit openings as needed to maintain a predetermined quantity of mass in each pan.

2. In a cooker for a vegetable mass, a multiplicity of superposed, jacketed cooking pans, each pan provided with an exit passage through the walls thereof; a thermostatic control for the heating agent; a sliding valve at the exit passage to vary the effective area thereof; motors to actuate each exit valve to vary without closing the valve the effective area of the exit opening; in combination with means within each pan to actuate the mass in a circular path and a swinging blade actuated by the movement of the mass; adjustable means between the blade and the motor to control the motor to vary the area of the exit openings as needed to maintain a predetermined quantity of mass in each pan.

3. In a cooker for a vegetable mass, a multiplicity of superposed jacketed cooking pans, each pan provided with an exit passage through the walls thereof, the successive openings being offset in a spiral line opposite to the direction of movement of the sweep; that sweep, rotating within each pan and moving the mass in a circular path, a thermostatic control for the heating agent; a valve controlling each exit passage and means to control each valve; all organized and combined, substantially as described, to maintain a predetermined amount of vegetable mass in each pan and the cooker.

Signed at Atlanta, Georgia, this 26th day of February, 1921.

NELSON B. HENRY.